H. W. LEONARD.
ELECTRICAL CONTROLLING DEVICE.
APPLICATION FILED JUNE 25, 1904.

1,061,191.

Patented May 6, 1913.

Witnesses
H. Ward Leonard Inventor
By his Attorney

H. W. LEONARD.
ELECTRICAL CONTROLLING DEVICE.
APPLICATION FILED JUNE 25, 1904.

1,061,191.

Patented May 6, 1913.
4 SHEETS—SHEET 2.

Witnesses
L. H. Sager.
George H. Kerr

H. Ward Leonard  Inventor
By his Attorney
C. W. Edwards

H. W. LEONARD.
ELECTRICAL CONTROLLING DEVICE.
APPLICATION FILED JUNE 25, 1904.

1,061,191.

Patented May 6, 1913.

Witnesses
J. C. Sager.
George N. Kerr

H. Ward Leonard Inventor
By his Attorney
C. V. Edwards

H. W. LEONARD.
ELECTRICAL CONTROLLING DEVICE.
APPLICATION FILED JUNE 25, 1904.

1,061,191.

Patented May 6, 1913.
4 SHEETS—SHEET 4.

Fig. 10.

WITNESSES

INVENTOR
H. Ward Leonard
BY
ATTORNEY

UNITED STATES PATENT OFFICE.

HARRY WARD LEONARD, OF BRONXVILLE, NEW YORK.

ELECTRICAL CONTROLLING DEVICE.

1,061,191.  Specification of Letters Patent.  Patented May 6, 1913.

Application filed June 25, 1904. Serial No. 214,142.

*To all whom it may concern:*

Be it known that I, HARRY WARD LEONARD, a citizen of the United States, residing at Bronxville, in the county of Westchester and State of New York, have invented certain new and useful Improvements in Electrical Controlling Devices, of which the following is a full, clear, and exact specification.

This invention relates to means for controlling the electromotive force upon the terminals of a translating device, and which is capable of being embodied in many different arrangements of apparatus and circuits, and capable of various applications.

The object of my invention is to provide improved means for controlling the electromotive force applied at the terminals of a translating device, such as a motor, battery, lamps, etc. By my invention the said electromotive force may be controllable at will and is automatically maintained constant at any desired value.

My invention will be understood by reference to the following description and accompanying drawings, and the novelty thereof will be more particularly set forth in the claims.

Figure 1:
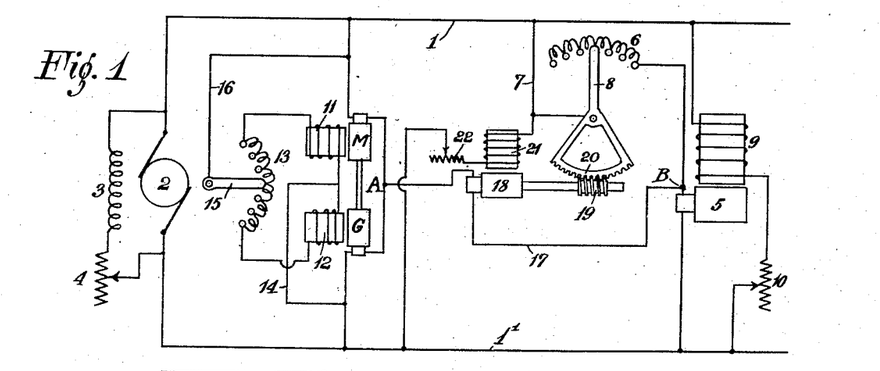
Figure 1 is a diagram illustrating an application of my invention for the purpose of maintaining the speed of a motor constant at any desired value with varying torque.

Fig. 1 discloses a method and means for maintaining the speed of an electric motor constant when connected on constant potential mains and subject to a varying torque. It is to be understood that the speed will not be absolutely constant but will be constant in the same sense that a shunt wound motor is described as a constant speed motor when operating at variable torques on a constant electromotive force circuit. It is well known that such a motor, if it has a considerable resistance in its armature circuit, will maintain a constant speed only when its torque is constant. Also in many classes of work it is desirable and important to operate the motor at different speeds by inserting resistance in the armature circuit and to be able to maintain constant any desired speed, even when the torque varies over a wide range.

I am able to accomplish this by means of my invention and in the manner illustrated in Fig. 1.

The positive and negative supply mains are indicated at 1, 1' and the constant potential source of electricity is represented by the direct current generator 2 having the field winding 3, and adjustable field resistance 4. The armature 5, of the motor which is to be driven is connected across the mains 1, 1' in series with a variable resistance 6, the current passing from line 1 by a connection 7 to the arm 8 of the rheostat. The field 9 of the motor is connected in shunt across the mains and in series with a variable field resistance 10. In another circuit between the mains 1, 1' are included in series, the armatures M, G of a small divided source of electromotive force comprising two dynamo electro-armature windings of a balancer set, the armatures being mechanically coupled. The field 11 of M has one terminal connected to one end of the variable resistance 13 and the other to the line 1' by the connection 14, and the field 12 of G has one terminal connected to the opposite end of the resistance 13 and the other terminal connected to line 1' as by wire 14. The arm 15 of the variable resistance 13 is connected by wire 16 to the line 1. From a point A in the connection between the armatures M and G extends a lead 17 to a point B in the connection between the resistance 6 and the armature 5 of the main motor. In the lead 17 is connected the armature 18 of a small motor which drives the arm 8 by some mechanical connection, as by the worm 19 and toothed extension 20 of arm 8. The field 21 for the armature 18 is connected across the lines 1, 1' through a field resistance 22 and is therefore independently and continually excited. The speed and direction of rotation of the armature 18 will consequently depend upon the voltage applied thereto and the direction of current through the same.

In order to explain the operation of the above described apparatus, I will assume as an example that the electromotive force of the main generator and of the line is 100 volts, and that the potential of line 1' is zero and that of line 1 is plus 100. I will suppose further that it is desired to operate the main motor at say half speed, and for sake of simplicity in description the slight losses in the various leads, armatures, etc., will be considered negligible. Since the field strength of the main motor is constant, half speed will be obtained by keeping a constant electromotive force of 50 volts on the armature terminals and if the potential of line 1' is assumed to be constantly at zero then the potential at point B must be maintained at 50. The potential of point B will be maintained at 50 in the following manner:—The arm 15 of the rheostat will be placed at the central position of the resistance 13 and the fields 11 and 12 will then be excited equally. In the operation of the motor generators M, G, the armatures of which are similarly wound, there will then be a difference of potential between line 1 and point A of 50 volts and between point A and line 1' there will also be a difference of potential of 50 volts and the potential of point A will therefore constantly remain at 50. Under normal conditions the potential at point B will be 50 and no current will pass through connection 17 and the armature 18 will be at rest. If, however, the torque of the main motor increases, then, on account of the increased current in the armature circuit, the volts dropped on the resistance 6 become greater than before and the potential of point B falls below 50 and the motor tends to slow down. As soon as the potential of B falls below 50 or that of point A, a current will flow from A to B through armature 18 and the latter will be rotated in such a direction that the arm 8 is moved so as to cut out some of the resistance 6. This will continue until the potential of B is raised to 50 or that of A when no current flows through armature 18 and the same comes to rest. If the torque on the main motor decreases, then the decreased current passing in the armature circuit will cause less drop to occur than before on the resistance 6 and the potential of B will then be higher than 50 and higher than the potential of A. This will cause a current to flow in the connection 17 from B to A through the armature 18 which will then be rotated in a direction opposite to that previously assumed, which will cut more of resistance 6 into the armature circuit and so decrease the potential of B to 50. The speed of the main motor is therefore maintained constant with a variable torque.

It is evident that the greater the change in torque and consequent variation of the potential of B, the greater will be the speed of the armature 18 and the more rapidly will the change of conditions be compensated for, and the nearer the normal condition of operation is approached the slower will be the speed of armature 18. The regulator therefore secures a condition of (approximately) constant speed in a most desirable manner giving rapid changes of the rheostat 6 for wide variations from normal conditions and slow changes for slight variations from normal conditions.

By simply moving the rheostat arm 15 the potential of point A can be made anything desired within the very wide limits permitted by the voltage of the supply mains and whenever the potential of A is adjusted to any desired amount, the potential of B will be regulated to the same potential and the speed of the main motor maintained at a corresponding speed. It is evident that the controlling resistance 13 may be located at a distance from the rest of the apparatus and this may be desirable in many applications.

It is unnecessary to go into an extensive discussion of how the current changes and the paths it follows in the above described apparatus, but as a specific illustration let us suppose that the machine 2 generates 100 volts and that the armature 5 is absorbing 50 amperes and operating at half speed, so that it has upon its terminals 50 volts and is absorbing therefore 2500 watts. Upon the rheostat 6 there will be 50 volts and 50 amperes, i. e. 2500 watts. The generator 2 will be producing 50 amperes at 100 volts, or 5000 watts. Now let us suppose that the torque of the load changes so that 61 amperes will be required to produce the torque required. If we assume that 61 amperes flows through the motor armature due to its slowing down under the increased torque and that 1 ampere in the armature 18 will produce the torque required to drive the worm 19, then the distribution of volts, amperes and watts will be as follows:—One ampere will be flowing from the point A to the point B, 60 amperes will be flowing from the line 1 through the rheostat to point B and 61 amperes will be flowing through the motor armature 5. It will be noted that the rheostat 6 contained 1 ohm in circuit before the change occurred since 50 amperes caused a drop of 50 volts. The passage of 60 amperes through the resistance of 1 ohm will cause a drop of 60 volts, consequently the potential of the point B after the increase in load will be 40; that is, there will be a difference of potential of 10 volts tending to send the current from A to B, and the armature of 18 will revolve at a speed corresponding to 10 volts to cut out resistance from the rheostat until the drop on the rheostat is 50 volts with 60 amperes flowing. The current in M will be ½ ampere, M acting as a motor. G acting as a generator will produce ½ ampere which at A will join the current of M and the joint current of 1 ampere will flow from A to B. The watts generated and absorbed will be as follows: The armature 5 will be absorbing 61 amperes at 40 volts making 2440 watts, the rheostat 6 will be absorbing 60 volts at 60 amperes making 3600 watts, and the armature 18 will be absorbing 1 ampere at 10 volts, or 10 watts, making a total of 6050 watts absorbed. This energy will be produced by the generator 2, giving 60.5 amperes at 100 volts. It will be noted that the watts absorbed by M are regenerated by G.

Figure 2:
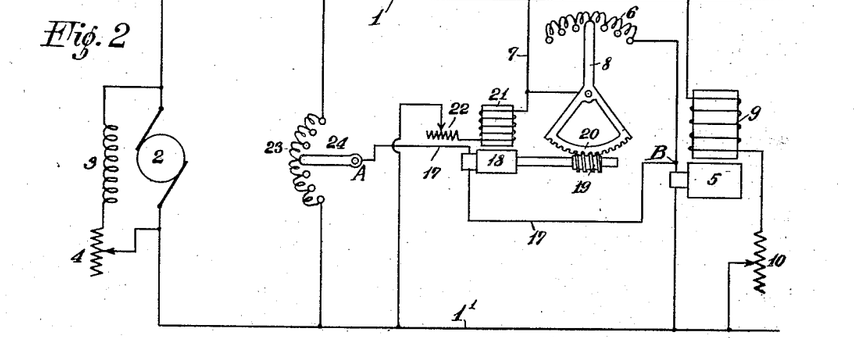
Figs. 2 to 10 are diagrams illustrating various modifications and applications of my invention.

Fig. 2 illustrates a modification of the above described apparatus in which the controlling potential or the potential of point A, is obtained by means of a variable resistance 23 connected between mains 1, 1', the wire 17 being connected to the arm 24 of the rheostat which by its movement gives a variable potential corresponding to that of point A of Fig. 1. This variable resistance therefore takes the place of the motor generator and controlling resistance 13 of Fig. 1 and the potential of B is maintained approximately constant by the operation of armature 18 in the same manner as before, the potential of B depending upon the position of the rheostat arm 24, which may be changed at will to any value between the potential of the mains 1, 1'.

The arrangement specified with reference to Fig. 2 is not so desirable as that of Fig. 1 in that the potential of A is variable with variation of current in 23.

In place of the motor generator of Fig. 1, I may also substitute a battery, or any other suitable source of electromotive force.

Figure 3:
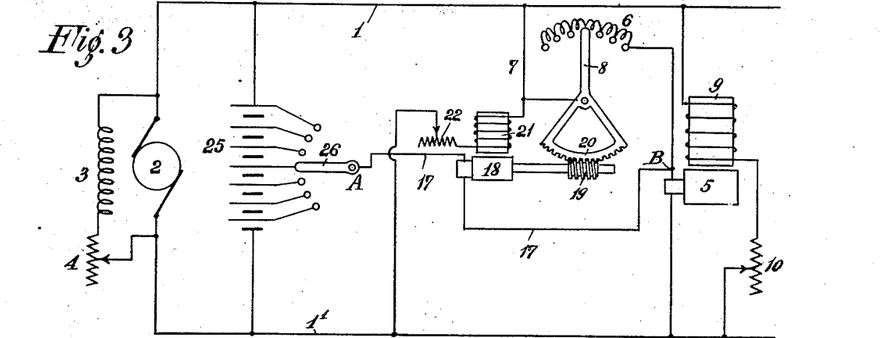

Fig. 3 illustrates an arrangement in which a storage battery is used for obtaining the regulating potential. The storage battery 25 is connected across the mains 1, 1' and the arm 26 in passing over the various contacts connected to the different elements of the battery will change the potential of point A to whatever is desired and thus control and maintain constant the speed of the main motor as before.

Figure 4:
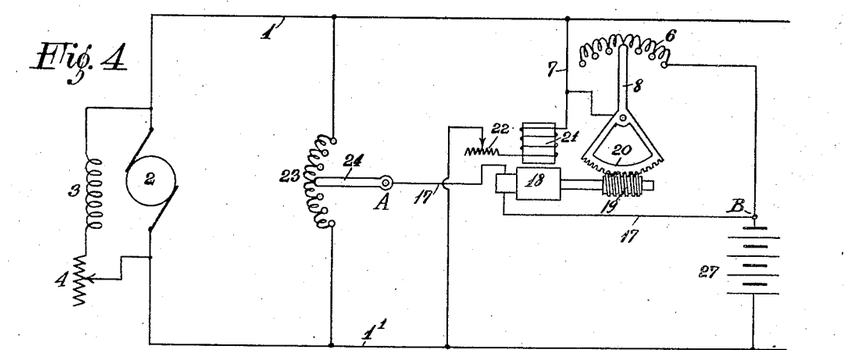

Fig. 4 illustrates my invention applied to the charging of storage batteries when the electromotive force of the line must be cut down considerably and when it is desirable to obtain any desired voltage and maintain the electromotive force at that desired voltage. The arrangement of the regulating apparatus is the same as shown in Fig. 2 the main motor 5, 9 being replaced by the storage battery 27. The arrangement shown will be of advantage in charging batteries of electric automobiles, the voltage of which may differ widely in different machines.

Figure 5:
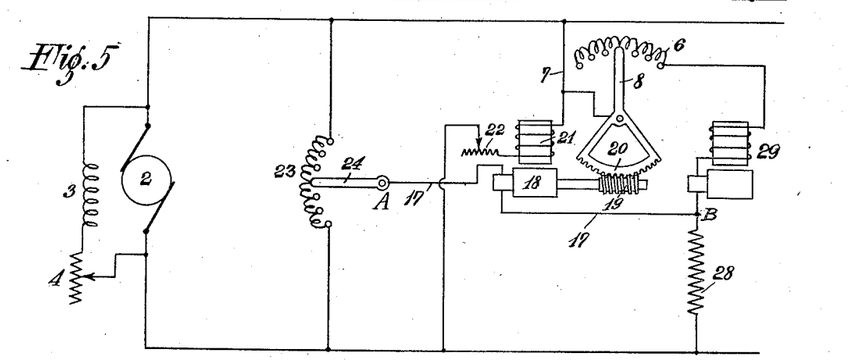

Fig. 5 illustrates an application of my invention for the purpose of keeping a current constant in any desired circuit, and of any desired value. The arrangement of the regulating apparatus is similar to that of Fig. 4, the storage battery being replaced by a certain fixed resistance 28 which is in series with a variable resistance 6 and the motor 29 or other device in which it is desired to maintain a constant current. The regulator will keep the potential of point B constant and the current through the resistance 28 will therefore be constant in amount which will maintain the current through the device 29 constant. It is evident that the value of this constant current can be made any amount desired by changing the rheostat arm 24. This latter arrangement may oftentimes be of value in connection with the operation of such devices as electrically propelled vehicles.

Figure 6:
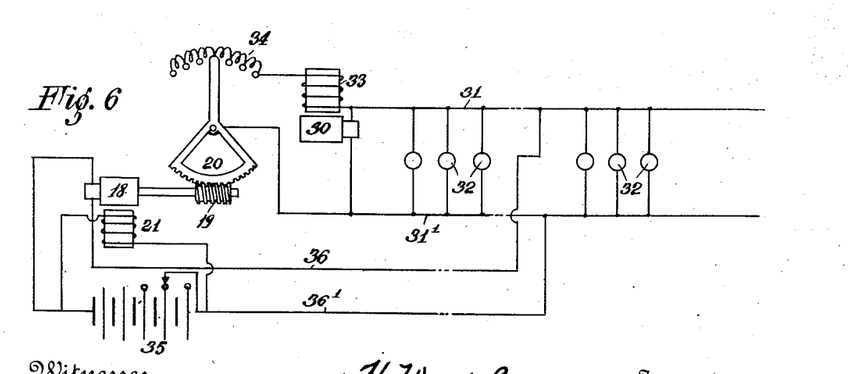

Fig. 6 shows a modified form of my invention and a different application thereof. 30 represents the armature of a generator supplying current to distributing mains 31, 31' of a system containing translating devices 32. The field 33 of the armature 30 is connected across the line and in series with a variable resistance 34. Connected across the line at any desired point, which may be near the generator or at some distance therefrom as illustrated in the present instance, is a constant source of electromotive force such as the battery 35 whose electromotive force is equal to and opposes the normal line voltage. In series with the battery 35 is the armature 18 of the small regulating motor which operates by means of the worm 19, the toothed arm 20 of the field rheostat of the main generator. The field 21 of the small motor which may be excited from any source, is shown connected across the terminals of the battery 35, and the speed and direction of rotation of armature 18 will depend upon the electromotive force on its terminals. If the voltage of the line at the point where the leads 36, 36' are connected rises above normal, then current will flow in one direction through the armature 18 and battery 35 and the armature 18 will be rotated in such a direction as to cut in some of the field resistance 34 and so lower the voltage of the generator. If the voltage on the line falls below normal, then current will flow in the opposite direction through the armature 18 and battery 35 which will cause the armature 18 to rotate in the opposite direction and cut out some of the field resistance 34 and so raise the voltage of the generator. A constant electromotive force will therefore be automatically maintained on the terminals of the leads 36, 36'. The electromotive force maintained on the mains 31, 31' may be varied if desired by including a greater or less number of cells of battery 35 in series. Also other sources of electromotive force may be used in place of battery 35 if desired.

Figure 7:
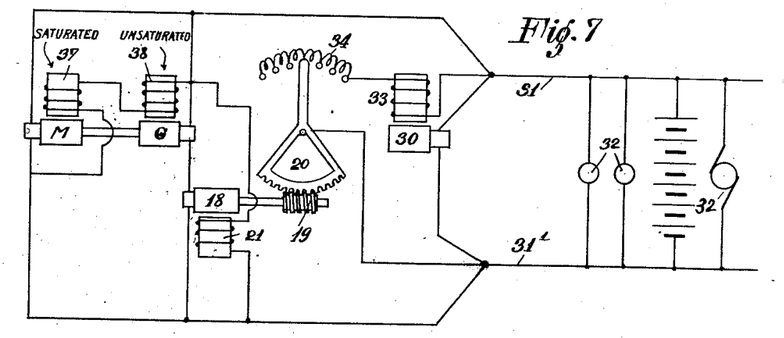

Fig. 7 shows another modified form of my invention by which the electromotive force of the generator may be maintained constant. The armature 30 of the generator supplies current to the mains 31, 31' which operates the translating devices 32. The field winding 33, is connected in shunt across the line through the resistance 34 as in Fig. 6. M, G represent the armatures of a motor generator mounted on the same shaft, the armature M being connected directly across the line and the armature G being connected across the line in series with the armature 18 of the regulating motor. The field 21 of the latter is connected across the line and this motor operates the worm 19 and rheostat arm 20 as before. The fields 37, 38 of the armatures M, G are connected in series across the line, the field 37 being designed to always have a saturated field under large variations of electromotive force, while field 38 is under normal conditions excited much below the knee of the saturation curve. The armatures M and G are wound so that M will generate an electromotive force approximately equal to the electromotive force of the line in its strong field and when conditions are stable G will generate approximately the same electromotive force in its weak field and of course in opposition to the line voltage. When the electromotive force of the line rises above normal, although the speed of M G will increase correspondingly, the electromotive force generated by G will increase more rapidly than that generated by M, on account of its increase in field strength due to its degree of saturation and a current will flow in one direction through armature 18 which will move the rheostat arm of the generator so as to lower its electromotive force. When the line voltage falls below normal, the electromotive force generated by G will be correspondingly lower than that generated by M on account of its decreased field strength and a current will then flow in the opposite direction through 18 and the electromotive force of the main generator raised. The electromotive force of the generator will therefore be maintained constant.

Figure 8:
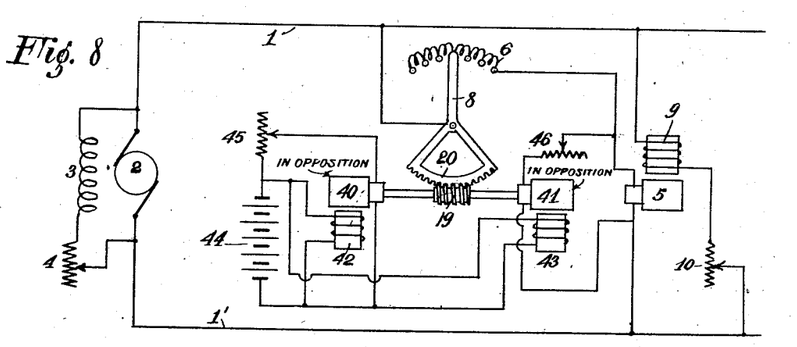

Fig. 8 shows a modified form of my invention in which the torque of two small armatures oppose each other and which control the operation of the regulating rheostat. The parts lettered in Fig. 8 similar to those of Fig. 1 represent the same elements and are similarly connected, there being the constant potential generator supplying current to mains on which the motor 5, 9 is connected and whose speed is to be kept constant. On the shaft of the worm 19 are mounted two armatures 40, 41 having the fields 42, 43. The armature 40 is connected across a source of constant electromotive force, such as the battery 44, through a variable resistance 45. The armature 41 is connected across the terminals of armature 5 in series with the adjustable resistance 46. The fields 42, 43 are shown connected across the terminals of the battery 44 and so have a constant strength. The connections are such that the torque of armature 40 opposes that of 41 and under normal conditions these armatures are at rest. If the electromotive force applied to the armature 5 rises above normal, the electromotive force applied to armature 41 will increase correspondingly which will increase the torque of armature 41. The greater torque of armature 41 will then overbalance that of 40 and the rheostat arm 8 will be moved in such a direction as to insert more of resistance 6 and lower the electromotive force of the armature 5. If the latter electromotive force falls below normal, then the constant torque of 40 will overbalance that of 41 and arm 8 will be moved in the opposite direction so as to increase the electromotive force at armature 5. This electromotive force and consequently the speed of armature 5 will therefore be automatically kept constant whatever the load on the motor may be. The speed of the motor can be changed by varying the resistance 45 or the number of cells included in the battery 44. Although I have shown this modification of my invention in connection with the application of Fig. 1, it is clear that a similar change may be made with reference to other applications.

Where great sensitiveness is desired and the regulation is to be kept within very close limits, I may introduce a polarized relay to control the operation of the variable adjusting means. I will describe such a relay control as applied in connection with the apparatus of Figs. 1 and 7, but it will be understood that the same may be applied as well to other instances.

Figure 9:
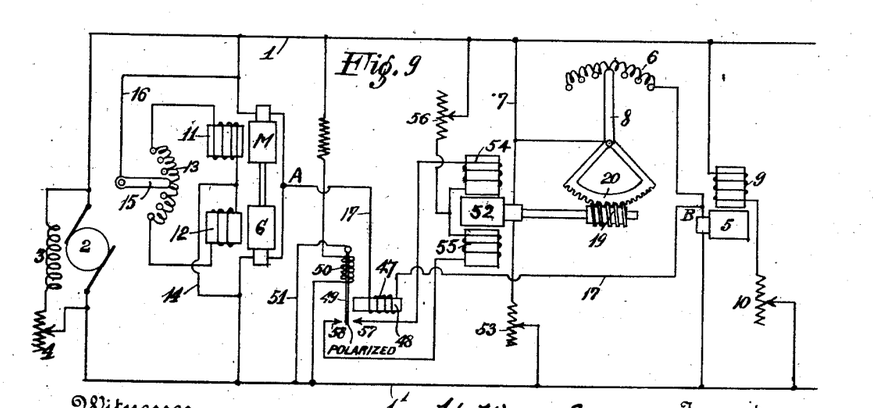

Referring to Fig. 9, the parts similarly indicated represent the same elements as in Fig. 1. In place of armature 18 being inserted in the connection 17 however, the coil 47 is connected therein. This coil is provided with a core 48 and has a pivoted armature 49. The latter has a constant polarity, in this instance being excited by a coil 50 connected across the line through suitable resistance. A connection 51 extends from the armature 49 to the main 1'. A reversible motor is used to drive the worm 19 and is indicated by an armature 52 connected across the line and in series with a resistance 53. The magnetic field is shown as being reversible in the present instance there being two windings 54, 55 having one terminal of each connected to line 1 through resistance 56, and the remaining two terminals connected, one to contact 57 and the other to contact 58. Any variation between the potential of points A and B will cause a current to flow in connection 17 exciting the core 48 and giving the pole nearest the armature 49 one polarity or the other depending upon the direction of current in coil 47. Suppose the potential of B falls below that of A. The polarity of 48 will then be such, let us say, as to attract armature 49 and cause its engagement with contact 57. Current will then flow from main 1 through field 54 to contact 57 and then to armature 49 and by lead 51 to main 1'. This will cause the armature 52 to revolve in such a direction as to change the resistance 6 so as to raise the potential of point B. If the potential of B becomes higher than that of A, then current will flow in the opposite direction through coil 47 and armature 49 will be repelled so as to engage contact 58. Current will then flow from main 1 through field winding 55 to contact 58, armature 49, lead 51 to main 1'. Since field 55 is wound reversely with reference to field 54, the armature 52 will then be driven in opposite direction and the resistance 6 will be changed so as to lower the potential of B. This arrangement may be made very sensitive, as only a slight current through coil 47 will be sufficient to cause armature 49 to be attracted or repelled.

Figure 10:
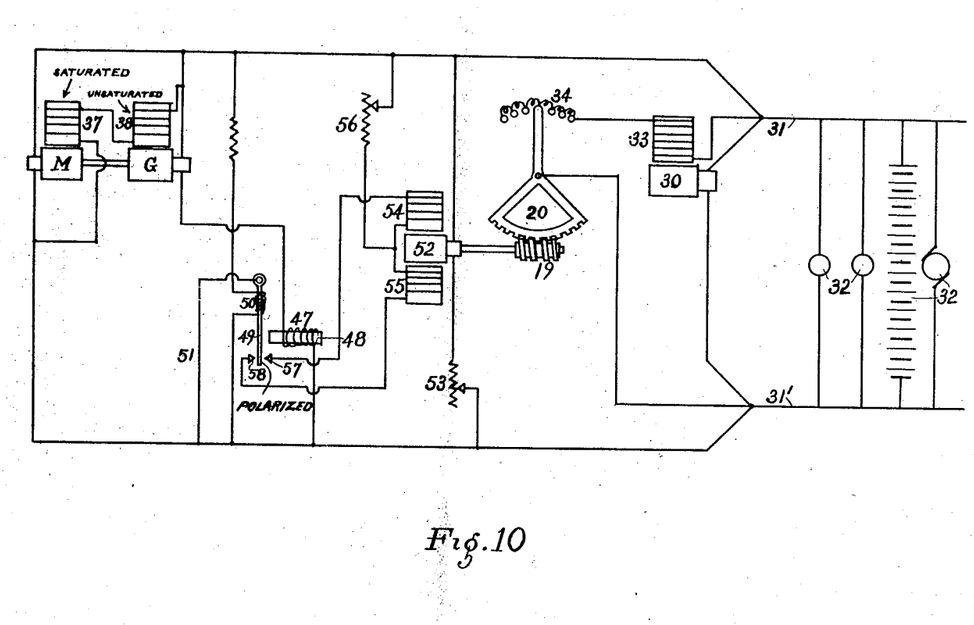

An application of the polarized relay to the construction indicated in Fig. 7 in order to secure additional sensitiveness of operation, is shown in Fig. 10. The parts similarly indicated represent the same elements as in Fig. 7. Instead of connecting the armature 18 in series with the armature G across the line, the coil 47 is connected therewith. The coil 47 is provided, as in Fig. 9, with a core 48, the polarity of which depends upon the direction of current through coil 47. In coöperation with the core 48 is the pivoted armature 49 having a constant polarity, being excited by a coil 50 connected across the line. The connection 51 is shown extending from the armature 49 to one side of the line. The motor for driving the variable resistance device to control resistance 34 is reversible and is controlled by the action of the polarized relay as in Fig. 9. The parts in Fig. 10 corresponding to those of Fig. 9 are similarly designated and operate as explained with reference to Fig. 9. In the modification shown in Fig. 10, the rise or fall of the electromotive force of the line will cause a current to flow in one direction or the other through the winding 47 as explained with reference to Fig. 7 and the armature 18. The armature 49 will consequently move to one side or the other making connection either with contact 57 or 58. Current will then pass from one side of the line through connection 51 and armature 49, and through field winding 54 or 55 of the reversible motor to the other side of the line. The armature 52 of the reversible motor will therefore rotate in a direction corresponding to the direction of current through coil 47 and cause the resistance 34 to be adjusted accordingly. The operation is therefore entirely similar to that described with reference to Fig. 7, except that greater sensitiveness is secured by interposing the relay.

While I have only described specifically the use of a continuous current, it will be evident that my invention may be applied to any current which is practically unidirectional in its magnetic effects.

While in most forms shown the two sources of E. M. F. are electrically connected it will be evident that my invention is applicable to many instances in which the two sources of electromotive force are not electrically connected and it is evident that my invention is capable of being carried into practice in many different ways and capable of various applications, and that I am not limited to the modifications shown and described.

Having thus described my invention, I declare that what I claim as new and desire to secure by Letters Patent, is,—

1. The combination of a source of magnetically induced electromotive force, a device having an opposing magnetically induced electromotive force, means for controllably varying the electromotive force of said device, said opposing electromotive force under normal conditions having a value fixed relative to that of the first named electromotive force, a device responsive to any change in the relative values of said electromotive forces, and means controlled by said second device for restoring the desired relation between the two electromotive forces.

2. The combination with a source of magnetically induced electromotive force, of a device having an electromotive force opposing the electromotive force of said source, a common source of electric energy upon which both of said electromotive forces are continually dependent, a device responsive to the difference between said electromotive forces, and means controlled by said second device for changing one of the electromotive forces to preserve a desired relation between them.

3. The combination with a source of magnetically induced electromotive force, of a device having an opposing electromotive force, a common source of energy upon which both of said electromotive forces are continually dependent, a device responsive to the difference between the electromotive forces and connected in circuit with said first named source and first named device, and means controlled by said second device for changing one of the electromotive forces to preserve a desired relation between them.

4. The combination of a source of magnetically induced electromotive force, a device having an opposing magnetically induced electromotive force, said device having a field magnet, means for controllably varying the field of said magnet for controllably varying said opposing electromotive force, a device responsive to the difference between the electromotive forces, one electromotive force tending to move said device in one direction, and the other electromotive force tending to move the same in the opposite direction, and means controlled by said second device for changing one of the electromotive forces to preserve a desired relation between it and the other electromotive force.

5. The combination with a source of electromotive force, a translating device, an adjustable rheostat for controlling the electromotive force applied to said device, a second source of electromotive force whose electromotive force may be made that desired on said device, electrical connections between said second source and said device, an electroresponsive device in circuit with said connections, and means connected with said electroresponsive device for varying said rheostat.

6. The combination with a source of constant electromotive force and supply mains, of a translating device and a variable resistance connected in series therewith and between said supply mains, a second source of electromotive force opposing the electromotive force applied to said device, an electroresponsive device in series with said translating device and said second source of electromotive force and controlled by the difference between the electromotive force applied to said device and that of said second source, and means operated by said electroresponsive device for varying said resistance.

7. The combination with the supply mains, of a translating device, a rheostat in series with said translating device, and means comprising a winding connected in a permanently closed circuit and subjected to currents in opposite directions and controlled by variation in the electromotive force at the terminals of said translating device for automatically controlling said rheostat so as to maintain a desired constant electromotive force on said translating device.

8. The combination with mains of constant electromotive force, of a motor whose speed is to be kept constant, said motor having a constant field strength, an adjustable resistance in series with the armature circuit of said motor across said mains, a regulating source of electromotive force, an electroresponsive device in circuit with said regulating source and motor armature, and means controlled by said device for varying said adjustable resistance.

9. The combination with a source of practically constant electromotive force, a translating device connected across the circuit thereof, a rheostat in series with said translating device, a divided source of electromotive force also connected across said circuit, a lead connecting the point of division of said divided source of electromotive force and point intermediate said rheostat and said translating device, and an auxiliary motor for operating said rheostat, said auxiliary motor having its armature connected in circuit with said lead.

10. The combination of a source of electromotive force and a supply circuit, a translating device connected to said circuit, and means for automatically maintaining constant the potential at one terminal of said translating device comprising an electroresponsive device electrically connected to said terminal and responsive to current therethrough in opposite directions which acts to correct any change from the desired potential.

11. The combination of a source of electromotive force and a supply circuit, a translating device connected to said circuit, and means for automatically maintaining the potential at one terminal of said translating device constant comprising an adjustable element, an electroresponsive controlling winding connected in a permanently closed circuit and subjected to currents in opposite directions, and electrical connections causing said element to move in one direction when the potential rises above the desired potential and to move in the opposite direction when the potential falls below the desired potential and thereby compensate for changes from the desired potential.

12. The combination of a source of electromotive force and supply mains, a translating device connected therewith, a movable device for controlling the electromotive force applied to said translating device, means for obtaining any desired constant electromotive force, and an electroresponsive device connected with said means and with said translating device for controlling the movement of said movable device to maintain desired constant conditions.

13. The combination of a source of electromotive force and supply mains, a translating device connected therewith, a movable device for varying the electromotive force applied to said translating device, means for obtaining any desired constant electromotive force, and means for automatically controlling the movement of said movable device to maintain an electromotive force at the terminals of said translating device having a fixed relation to said desired constant electromotive force.

14. The combination of a source of electromotive force and supply mains, a translating device connected therewith, a movable device for varying the electromotive force supplied to said translating device, means for obtaining any desired constant electromotive force, and means for automatically controlling the movement of said movable device to maintain an electromotive force at the terminals of said translating device equal to said desired constant electromotive force.

15. The combination of a source of electromotive force and supply mains, a translating device connected therewith, a movable device for varying the electromotive force supplied to said translating device, an adjustable device for obtaining any desired constant electromotive force, and an electroresponsive device electrically connected with said translating device and to the circuit upon which the constant electromotive force is impressed for automatically controlling the movement of said movable device to maintain practically the same electromotive force at the terminals of said translating device.

16. The combination of a source of electromotive force and supply mains, a motor, a movable device for varying the electromotive force supplied to the armature terminals of said motor, adjustable means for obtaining any desired constant electromotive force, and an electroresponsive device electrically connected to said armature and to the circuit containing the desired constant electromotive force for automatically controlling the movement of said movable device to maintain a corresponding constant electromotive force at the terminals of said motor armature.

17. The combination of a source of electromotive force and supply mains, a motor, an adjustable resistance in series with the motor armature across said supply mains, means for obtaining a desired constant electromotive force, and an electroresponsive device electrically connected to said armature and to a circuit having the said constant electromotive force impressed thereon for automatically controlling the amount of said resistance in series with the motor armature to maintain the corresponding constant electromotive force at the terminals of said motor armature.

18. The combination of a source of electromotive force and supply mains, a translating device and a variable resistance connected in series across said supply mains, means for obtaining a desired constant electromotive force, and an electroresponsive device electrically connected with said translating device and to a circuit having the said constant electromotive force impressed thereon for automatically controlling the amount of said resistance in series with said translating device.

19. The combination of a source of electromotive force, a translating device, means for obtaining a desired constant electromotive force, a movable device for varying the electromotive force applied to said translating device, and an electroresponsive device which is subjected to the difference between said constant electromotive force and that applied to said translating device for automatically controlling the movement of said movable device.

20. The combination of an electric circuit, means for impressing an electromotive force thereon in one direction, a translating device in said circuit, means for applying an electromotive force to said translating device which opposes the said impressed electromotive force in said circuit, an adjustable device for varying the electromotive force applied to said translating device, and electroresponsive means responsive to the difference between said impressed electromotive force and the electromotive force applied to said translating device for automatically controlling said adjustable device to cause the electromotive force applied to said translating device to equal said impressed electromotive force.

21. The combination of an electric circuit, means for impressing an electromotive force thereon in one direction, a translating device in said circuit, means for applying an electromotive force to the said translating device which opposes the said impressed electromotive force in said circuit, an adjustable device for varying the electromotive force applied to the said translating device, a relay device controlled by current in said circuit, and an electric motor controlled by said relay for varying one of said electromotive forces with reference to the other for maintaining the desired relation between them.

22. The combination of an electric circuit, means for impressing an electromotive force thereon in one direction, a translating device in said circuit, means for applying an electromotive force to said translating device which opposes said impressed electromotive force in the said circuit, an adjustable device for varying the electromotive force applied to the said translating device, a relay device responsive to the difference between said impressed electromotive force and the electromotive force applied to said translating device, and means comprising an electric motor controlled by said relay device for affecting said translating device for causing one of said electromotive forces to balance the other.

23. The combination of a source of electromotive force and supply mains, a translating device connected therewith, a movable device for regulating the electromotive force applied to said translating device, means for obtaining a desired constant electromotive force, a relay device responsive to the difference in electromotive force between that applied to said translating device and said constant electromotive force, and an electric motive device controlled by said relay for moving said movable device.

24. The combination of a source of electromotive force and supply mains, a translating device, means for obtaining a desired constant electromotive force opposing that applied to said device, a circuit subjected to said constant electromotive force and to that applied to said translating device, a relay device in said circuit and responsive to the difference between electromotive forces applied thereto, and an electric motive device whose direction of movement is controlled by said relay for balancing the electromotive forces in said circuit.

25. The combination of a source of electromotive force and supply mains, a motor, a movable device for varying the electromotive force applied to the armature terminals of said motor, means for obtaining a desired constant electromotive force, a circuit subjected to said constant electromotive force and to that applied to the said motor armature, a relay device in said circuit and responsive to the difference between the electromotive forces applied thereto, and an electric motive device whose direction of movement is controlled by said relay for controlling said movable device.

26. The combination of a source of electromotive force and supply mains, a translating device and a variable resistance connected in series across said supply mains, means for obtaining a desired constant electromotive force, a circuit subjected to said constant electromotive force and to that applied to said translating device, a relay device in said circuit and responsive to the difference between the electromotive forces applied thereto, and an electric motive device whose direction of movement is controlled by said relay for controlling said variable resistance.

27. The combination with a source of constant electromotive force and supply mains, of a translating device and a device having means for varying the electromotive force at its terminals connected in series and across said supply mains, a second source of electromotive force opposing said first source, an electroresponsive device in series with said translating device and with said second source of electromotive force, and means operated by said electroresponsive device for controlling said second device.

28. The combination of a source of electromotive force, a translating device, means for obtaining a desired constant electromotive force, a device for varying the electromotive force applied to said translating device, and an electroresponsive device which is subjected to the difference between said constant electromotive force and that applied to said translating device for automatically controlling said device.

29. The combination of an electric circuit, means for impressing an electromotive force thereon in one direction, a translating device in said circuit, means for applying an electromotive force to said translating device which has a desired relation to and which opposes said impressed electromotive force in said circuit, an adjustable device for varying one of said electromotive forces, a relay device controlled by current in said circuit, and means controlled by said relay device for affecting said adjustable device and thereby varying one of said electromotive forces to maintain the said desired relation.

30. The combination with an electric motor and a source of supply therefor, of automatic speed regulating means, comprising a device for obtaining an electromotive force, and an electroresponsive means responsive to the joint effect of the motor electromotive force and the electromotive force of said device for controlling the speed of the motor.

31. The combination with a source of supply and a translating device on the terminals of which it is desired to control the electromotive force, of means for producing an electromotive force, and electroresponsive means responsive to the joint effect of the electromotive force produced by said means and the electromotive force on the translating device for automatically controlling the electromotive force on the translating device.

32. The combination of a constant electromotive force supply circuit, a translating device supplied therefrom and upon whose terminals it is desired to maintain a constant electromotive force different from that of the supply circuit, means for obtaining a controllable electromotive force of a desired value, and electroresponsive means responsive to the joint effect of said electromotive force and the electromotive force on the translating device for automatically varying and thereby controlling the electromotive force on the translating device.

33. The combination of an electric circuit, means for impressing an electromotive force thereon in one direction, a translating device in said circuit, means for applying an electromotive force to said translating device which opposes the said impressed electromotive force in said circuit, an adjustable device for varying one of said electromotive forces, a responsive electromagnetic winding connected in said circuit, and means controlled by said responsive winding for automatically controlling said adjustable device.

34. The combination of a circuit upon which it is desired to maintain a definite condition, two electromagnetic devices each having electromotive force, the said devices being connected in circuit so as to have their electromotive forces oppose each other, and a device responsive to the joint effect of said electromotive forces for automatically maintaining the desired condition on said first named circuit.

35. The combination of a circuit connection upon which it is desired to maintain a substantially constant electrical condition, a circuit connection containing an electroresponsive winding in which the current is normally zero, two opposing dynamo electromotive force producing devices in series with each other and with said winding and acting to cause a current to automatically flow in one direction through said winding when said electrical condition varies in one sense and to cause a current to automatically flow in the other direction through said winding when said electrical condition varies in the other sense, and means affected thereby for automatically restoring the desired electrical condition.

36. The combination of a constant electromotive force supply circuit, an electric motor, a rheostat connected in series with the armature of said motor across said circuit, an electromagnetic winding and an electromotive force producing device connected in a circuit extending from a point between the connection of said armature and said rheostat to one of the mains of said supply circuit, and means controlled by said winding for automatically increasing and decreasing the resistance of said rheostat for automatically controlling the speed of the motor.

37. The combination of a constant electromotive force supply circuit, an electric motor, an adjustable rheostat connected in series with the armature of said motor across said circuit, an auxiliary electromotive force producing device, and automatic means functionally related thereto for automatically controlling the amount of resistance of said rheostat in series with said armature whereby a constant speed of the motor is automatically maintained.

38. The combination of a source of electromotive force, an electric motor, a rheostat in series with the armature of said motor, automatic electroresponsive means for varying the resistance of said rheostat for automatically maintaining upon the motor armature a substantially constant electromotive force, said means comprising a controlling winding responsive to a reversal of current, and adjustable means for causing said automatic means to maintain any desired constant electromotive force upon said motor armature.

39. The combination of a source of supply, an electric motor, a speed regulating rheostat connected in series with the armature thereof, and automatic means responsive to a change in the potential of the point between the rheostat and said motor armature for automatically varying the resistance of said rheostat and thereby automatically controlling the speed of the motor, said automatic means comprising a controlling winding and also comprising means for reversing the current in said winding to automatically vary the resistance and thereby control the speed of the motor.

40. The combination of a constant electromotive force supply circuit, an electric motor, a speed controlling rheostat therefor connected in series with the armature of said motor across said circuit, a second circuit connected across said supply circuit and containing means for producing a potential intermediate that of the supply conductors, a conductor from a point of intermediate potential in said second circuit to a point between the motor armature and said rheostat, and means comprising an electroresponsive device in said conductor for automatically controlling said rheostat.

41. The combination of constant electromotive force supply mains, an electric motor, a rheostat connected in series with the armature of said motor across said mains, means comprising a conductor for obtaining upon said conductor a substantially fixed potential between the potentials of said mains, an electroresponsive device connected in circuit between said conductor of fixed potential and the portion of the circuit between said motor armature and said rheostat, and means responsive to current in said device for automatically varying the resistance of said rheostat.

42. An electric motor the torque of which is variable under conditions of practice, a source of supply therefor and means for automatically maintaining the speed of the motor at any desired speed, said means comprising a controlling magnetic winding subjected to a current therethrough in one direction when the motor speed goes beyond a limit in one sense and subjected to a current therethrough in the reverse direction when the motor speed goes beyond a limit in the other sense.

43. An electric motor, a source of supply therefor, a winding connected therewith, means for causing a current to flow in one direction through said winding when the motor speed exceeds a certain limit and for causing a current to flow through said winding in the reverse direction when the motor speed falls below a certain limit, and means controlled by said winding for automatically holding the speed of the motor between said limits.

44. The combination of a source of electric energy, a device having an electromotive force developed in it by magnetic induction, the electromotive force of which and the current therethrough varies in response to uncontrollable changes in conditions of practice, a device for varying the individual electromotive force applied thereto and for maintaining thereon a desired electromotive force less than that of said source, and automatic means for controlling said varying device responsive to change from said desired electromotive force, said means comprising a device having an electromotive force developed in it by magnetic induction connected across said source.

In testimony whereof I affix my signature, in presence of two witnesses.

H. WARD LEONARD.

Witnesses:
CAROLYN G. LEONARD,
L. K. SAGER.